June 1, 1937.  C. M. VOORHEES  2,082,670
SWEEP RAKE
Filed Nov. 27, 1935

Charles M. Voorhees, INVENTOR
BY Victor J. Evans & Co.
ATTORNEY

Patented June 1, 1937

2,082,670

UNITED STATES PATENT OFFICE 2,082,670

SWEEP RAKE

Charles M. Voorhees, Madison, Kans.

Application November 27, 1935, Serial No. 51,917

1 Claim. (Cl. 56—396)

This invention relates to sweep rakes of the sweep type and more particularly to mountings for connecting ground wheels of the caster type to the rake and which act to connect teeth supporting bars of the rake together and in spaced relation to each other.

With these and other objects in view, this invention consists in certain novel features of construction, combination and arrangement of parts to be hereinafter more fully described and claimed.

For a complete understanding of my invention, reference is to be had to the following description and accompanying drawing, in which Figure 1 is a plan view illustrating a sweep rake constructed in accordance with my invention.

Figure 2 is a sectional view taken on the line 2—2 of Figure 1.

Figure 3 is a plan view illustrating the mounting employed for connecting a ground wheel to the teeth supporting rods of the rake and acting to connect said rods.

Referring in detail to the drawing, the numeral 1 indicates a plurality of relatively spaced parallel teeth bolted or otherwise secured to hollow rods 2. The rods are arranged adjacent one end of the teeth and act to maintain said teeth in proper relation with each other. The rods are connected by spaced mountings 3 to maintain said rods in parallel spaced relation to each other. Seats 3' are formed in the mountings 3 to receive the bars 2. A rack 4 of a conventional construction is secured to and supported by the bars. Each mounting 3 has connected thereto a ground wheel 5 of the caster type including a forked portion 6 to which the wheel is journaled and has a head 7 journaled thereon. The head 7 carries a stem 8 to extend through the mounting and receive thereon a nut 9. Anti-friction ball bearings are arranged between the forked portion 6 and the head 7. Each mounting 3 includes a body portion 10 of elongated formation and is recessed to form the seats 3' to receive the rods 2. The bodies 10 have openings 10' to receive U-clamps 11. The U-clamps 11 extend through the body and about the rods and thereby effectively secure said rods in the seats 3' of the bodies 10. Each body between the seats 3' is increased in thickness to form a journal or bearing portion 8' of maximum strength to receive the stem 8 of the ground wheel.

Having described the invention, I claim:

A sweep rake comprising spaced hollow rods, teeth secured to said rods, a rack secured to said rods, elongated mountings having spaced recesses receiving said rods, U-clamps securing the rods in the recesses and preventing said rods from moving relative to one another, said mountings having their thicknesses increased between the rods and apertured, stems extending through the apertured portions of the mountings, heads secured to said stems, forked members journaled on said heads, and ground wheels journaled on said forked members.

CHARLES M. VOORHEES.